March 8, 1960
J. L. STEPHENS
2,927,605
CHECK VALVE HAVING CLOSED CIRCUIT
HYDRAULIC SHOCK ABSORBING SYSTEM
Filed Oct. 9, 1956
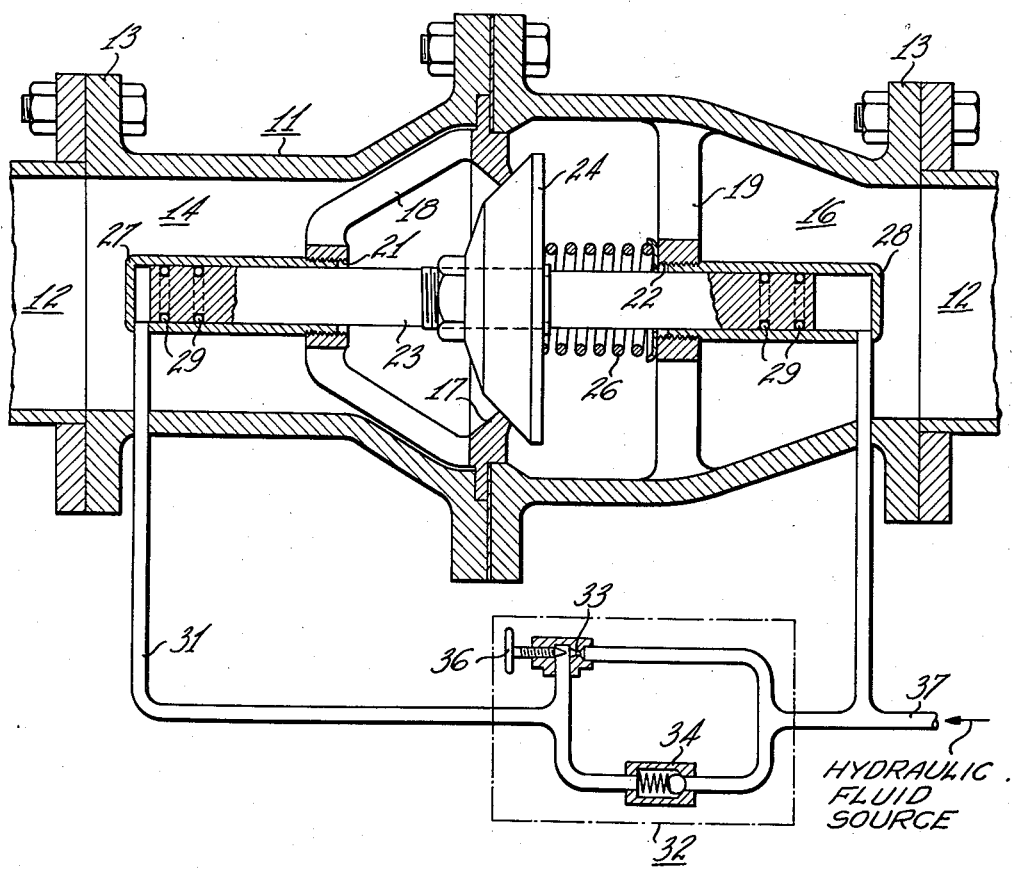
Inventor
John L. Stephens
by Joseph E. Kerwin
Attorney _United States Patent Office_

2,927,605
Patented Mar. 8, 1960

2,927,605

CHECK VALVE HAVING CLOSED CIRCUIT HYDRAULIC SHOCK ABSORBING SYSTEM

John L. Stephens, West Allis, Wis., assignor to Allis-Chalmers Manufacturing Company, Milwaukee, Wis.

Application October 9, 1956, Serial No. 614,942

3 Claims. (Cl. 137—514.5)

This invention relates to improvements in valves for controlling the distribution of a fluid and more particularly to self-closing check valves to prevent reversal of the flow in a fluid distribution line.

When a plurality of impelling machines, such for example as blowers, or compressors, or pumps, are connected to a common distribution system, it is desirable to place a check valve in the discharge conduit from each blower, or compressor, or pump to prevent flow of fluid back through the machine upon the occurrence of any conditions under which the output pressure of the machine becomes less than that of the connected distribution line. Such reversal of flow in machines of the above mentioned type must be positively prevented to avoid damage or even destruction of the machine due to excessive speed.

A check valve must therefore be positively self-closing when the machine delivery pressure drops below the distribution line pressure.

When the machines are designed to supply a large quantity of fluid at a relatively low pressure the check valve should be designed to provide a full and free passageway therethrough without friction or throttling effect to thereby avoid losses which may account to a substantial percentage of the delivery pressure of the machine. Such decrease in the delivery pressure due to undesired throttling would materially increase the operating costs of the machine, and hence the operating costs of the entire installation.

The check valve itself to be suitable for this type of service should be constructed so as to operate freely, automatically, without chatter, slamming or hammering, must have a long life, be trouble free and require little or no maintenance.

The valve disk should move away from its seat during the opening movement thereof and should be pressed on its seat upon closure thereof to avoid frictional losses in opening, and thus to permit minimization of the operating means and to secure the best possible seating in the closing position to avoid leakage of the fluid therethrough.

It is therefore among the objects of the present invention to provide an improved check valve which opens in response to a force applied thereto from the pressure conduit.

Another object of the invention is to provide an improved check valve which has a tendency to close and which closes automatically upon withdrawal of the force applied to open the valve.

Another object of the invention is to provide a check valve in which the element is opened and closed at differentially controlled rates of movement.

Still another object of the invention is to provide a check valve in which the valve disk or element is itself combined with shock absorptive means in the pressure conduit so as to eliminate chatter, slamming, or hammering, and as to cause positive seating in closing.

Objects and advantages other than those above set forth will be apparent from the following description when read in connection with the accompanying drawing, in which the single figure is a horizontal cross sectional view of a check valve embodying the present invention. The view is taken on a central plane on the axis of the check valve showing the valve disk in the closed position.

Referring more particularly to the drawing there is shown a main check valve with valve body 11 connected into a pressure conduit or distribution line 12 through the flanged ports 13, one being the inlet passage 14, the other being the outlet passage 16. The valve body has a valve seat 17 positioned within the valve body, and the valve seat having attached a web flange support 18 containing a central bore 21 which is axially aligned within and with the valve body on the inlet side of the valve seat.

On the other side of the valve seat is an internal web flange support 19 which also contains a central bore 22 axially aligned within and with the valve body. The internal web flange support is positioned between the valve seat and the outlet passage.

Intermediate and extending through the above mentioned bores is a valve shaft 23 positioned so that it has freedom to reciprocate. Connected to the valve shaft is a pressure responsive valve disk or element 24 that is positioned intermediate the valve seat 17 and internal web flange support 19. Interposed between the internal web flange support 19 and the valve disk 24 is biasing means such as a coiled spring 26 which tends to hold the valve disk on the valve seat.

Two equal area hydraulic cylinders 27 and 28 are on opposite ends of the valve shaft. The hydraulic cylinders are affixed to the respective web flange supports as indicated in the drawing so that the open ends of the cylinders are opposite each other, allowing the valve shaft extremities to be within the cylinders.

It is to be noted that the combination of the flange supports, valve shaft, and hydraulic cylinders are aligned along the axis of the valve body.

Suitable sealing means are provided to prevent leakage between the valve shaft and the hydraulic cylinders, and are shown as O rings 29 carried on the shaft. Thus, the portions of the shaft on opposite sides of the valve disk or element are in effect displacement members coacting with cylinders.

Connecting one hydraulic cylinder to the other is a hydraulic fluid line or circuit 31. This hydraulic fluid line extends from one hydraulic cylinder at its head end, traverses half the valve chamber within the valve body, goes through the valve body, extends externally along the valve body and reenters through the body across to the head end of the other cylinder.

Within the hydraulic fluid line portion external of the valve body is valve means 32. The valve means consists of a flow restricting orifice 33 in parallel with an auxiliary fluid check valve 34 as a means to differentially control the rate of fluid flow differentially effecting the opening and closing movement of the main valve element. The flow restricting orifice has an adjustable needle valve 36, and the auxiliary check valve 34 being a valve suitable for allowing freedom of flow in one direction and preventing flow in the opposite direction. A hydraulic fluid source 37 is connected to the fluid line as indicated in the drawing to replenish any loss of hydraulic fluid due to leakage.

In the operation of the check valve, as shown in the drawing, the valve disk 24 is seated against the valve seat 17. With a pressure drop across the valve disk from the pressure in the valve, the pressure on the disk 24 will tend to move the disk against the spring 26. During this opening the valve shaft 23 will move farther into the cylinder 28 thus displacing the hydraulic fluid, such as oil, or water, or whatever is being used in the line 31. When the fluid in the line thus moves, the auxiliary check valve 34 opens permitting the unretarded flow of the fluid from cylinder 28 to the other cylinder 27, the restricting orifice 33 in this instance not being effective as the fluid bypasses through the auxiliary check valve. Therefore, by allowing the hydraulic fluid in the fluid line 31 to flow unrestricted there may be a rapid movement of the valve disk 24 away from the valve seat 17 permitting the passage of air or gas in the pressure conduit. When the air or gas pressure within the valve body diminishes below the force of the return spring 26 in the valve disk or element 24 will be forced back on the valve seat 17. However, the movement of the valve disk 24 on the valve shaft 23 towards the valve seat 17 is damped, because the fluid must then flow from cylinder 27 to cylinder 28 through the fluid line 31. Movement of the fluid in this direction causes the auxiliary check valve 34 to close against its seat so that fluid flow is only through the restricting orifice 33. This imposes a restraining force against the action of the return spring 26 and gives a positive damping effect on the valve disk 24, eliminating vibration or chattering of the spring and mass system which the main check valve itself comprises.

Needle valve 36 will allow one to regulate the control of the hydraulic fluid flow through the restricting orifice 33, therefore providing the means of selected settings under varied conditions.

The fluid source means 37 for the hydraulic system may be of any type; such as a gravity feed pot, or oiler, or a connection from any fluid line which will insure that the hydraulic system will have fluid in it at all times during operation. The fluid source should be arranged so that gravity will eliminate any gas or air in the system so that the closed circuit will at all times contain a noncompressible fluid, as a pocket of air will tend to defeat the purpose of the damping system.

Although only one embodiment of the present invention has been illustrated and described it will be apparent to those skilled in the art that various changes and modifications may be made therein without departing from the spirit of the invention or from the scope of the appended claims.

What is claimed is:

1. In a valve comprising a valve body adapted to be connected into a fluid pressure line, said valve body having inlet and outlet passages, a valve seat in said valve body, two equal volume hydraulic cylinders disposed opposite each other in said valve body, a valve shaft disposed within said valve body with said hydraulic cylinders on opposite ends thereof, said opposite ends of said valve shaft having equal exposed fluid pressure responsive surface areas, a valve disk fixed upon said valve shaft, spring means tending to hold said valve disk against said valve seat, a hydraulic fluid line closed to atmosphere and comprising a branch loop therein and connecting said hydraulic cylinders, sealing means cooperating between said valve shaft and said hydraulic cylinders to prevent leakage, valve means interposed in said fluid line comprising a flow restricting orifice in one branch of the loop and a check valve in the other branch of the loop in parallel relation with said orifice, and said check valve allowing a free flow of the hydraulic fluid in one direction and preventing flow of the hydraulic fluid in the opposite direction.

2. In a valve comprising a valve body adapted to be connected into a fluid pressure line, said valve body having inlet and outlet passages, a valve seat in said valve body, two equal volume hydraulic cylinders disposed opposite each other in said valve body, a valve shaft disposed within said valve body with said hydraulic cylinders on opposite ends thereof, said opposite ends of said valve shaft having equal exposed fluid pressure responsive surface areas, a valve disk fixed upon said valve shaft, biasing means tending to hold said valve disk against said valve seat, a hydraulic fluid line closed to atmosphere and comprising a branch loop therein and connecting said hydraulic cylinders, sealing means cooperating between said valve shaft and said hydraulic cylinders to prevent leakage, valve means interposed in said fluid line comprising a flow restricting orifice in one branch of the loop and a check valve in the other branch of the loop in parallel relation with said orifice, said flow restricting orifice having an adjustably operated needle valve regulating the restriction in controlling the rate of flow of the hydraulic fluid through said restricting orifice, and said fluid check valve allowing free flow of the hydraulic fluid in one direction and no flow of said fluid in the opposite direction.

3. In a valve comprising a valve body adapted to be connected into a fluid pressure line, said valve body having inlet and outlet passages, a valve seat in said valve body, two equal volume hydraulic cylinders disposed opposite each other in said valve body, a valve shaft disposed within said valve body with said hydraulic cylinders on opposite ends thereof, said opposite ends of said valve shaft having equal exposed fluid pressure responsive surface areas, a valve disk fixed upon said valve shaft, biasing means tending to hold said valve disk against said valve seat, a hydraulic fluid line closed to atmosphere and comprising a branch loop therein and connecting the hydraulic cylinders, sealing means cooperating between said valve shaft and said hydraulic cylinders to prevent leakage, valve means interposed in said fluid line comprising a flow restricting orifice in one branch of the loop and a check valve in the other branch of the loop in parallel relation with said orifice, said fluid check valve having a ball and spring means allowing free flow of the hydraulic fluid in one direction in response to said main valve disk being unseated from said valve seat and preventing flow of said hydraulic fluid in the opposite direction, and the restricting orifice having an adjustably operated needle valve regulating the restriction and controlling the rate of flow of the hydraulic fluid causing damping of said main valve disk in seating upon said valve seat.

References Cited in the file of this patent

UNITED STATES PATENTS

| | | |
|---|---|---|
| 675,969 | Parry | June 11, 1901 |
| 1,205,818 | Thomas | Nov. 21, 1916 |
| 1,466,171 | Jacobsen | Aug. 28, 1923 |
| 1,542,051 | Gedney | June 16, 1925 |
| 1,804,060 | Morrill | May 5, 1931 |